(No Model.)

A. B. CARTER.
DEVICE FOR ATTACHING WHEELS TO AXLES.

No. 285,341. Patented Sept. 18, 1883.

Witnesses
S. N. Piper
E. B. Pratt

Inventor:
Alba Briggs Carter
by R. H. Eddy atty.

UNITED STATES PATENT OFFICE.

ALBA BRIGGS CARTER, OF GREAT FALLS, ASSIGNOR OF ONE-HALF TO CHARLES W. PRESCOTT, OF RAYMOND, AND SULLIVAN H. ATKINS, OF MILTON MILLS, NEW HAMPSHIRE.

DEVICE FOR ATTACHING WHEELS TO AXLES.

SPECIFICATION forming part of Letters Patent No. 285,341, dated September 18, 1883.

Application filed June 13, 1883. (No model.)

*To all whom it may concern:*

Be it known that I, ALBA BRIGGS CARTER, of Great Falls, in the town of Somersworth, in the county of Strafford, of the State of New Hampshire, have invented a new and useful Improvement in Carriage-Wheels and their Axles; and I do hereby declare the same to be described in the following specification and represented in the accompanying drawings, of which—

Figure 1:
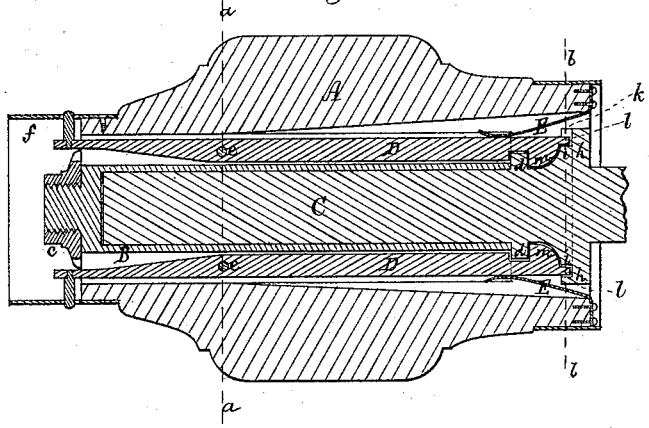
Figure 2:
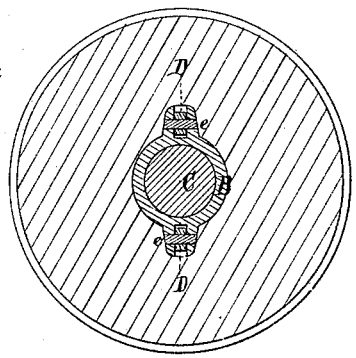
Figure 3:
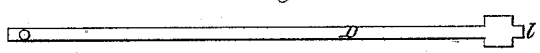
Figure 4:
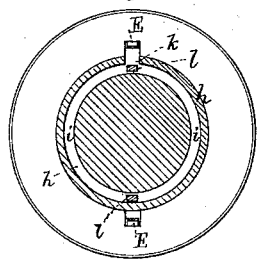
Figure 5:
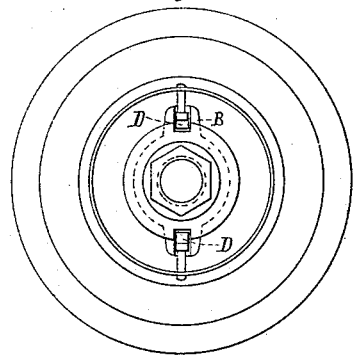
Figure 6:
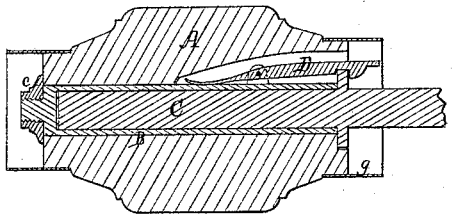

Figure 1 is a longitudinal section of a wheel-hub and the axle-journal thereof provided with my invention. Fig. 2 is a transverse section of such on the line $a\,a$ of Fig. 1. Fig. 3 is a top view of one of the catch-levers. Fig. 4 is a transverse section on line $b\,b$ of Fig. 1. Fig. 5 is an elevation of the outer end of the hub. Fig. 6 is a longitudinal section of a hub and the axle-journal thereof as provided with but one catch-lever, instead of two, as represented in Fig. 1.

The object of the improvement is to dispense with the nut, as usually employed, to hold a wheel in engagement with the axle of a carriage, such nut being very liable to accidentally work loose, especially in the process of moving the carriage backward.

The nature of my invention will be understood and defined by the claims hereinafter presented.

In the drawings, A denotes a wheel-hub, B the journal-box thereof, and C the journal of the axle. By means of a collar fixed on a nut, $c$, screwed on the closed outer end of the box and against that of the hub, such box is held within the hub against forces tending, when the wheel may be in use, to draw the box out of place in the hub. The box, at its inner end, is open to receive the journal, and abuts against a flange, $d$, extending from and around the journal.

The hub, as shown in Fig. 1, is suitably recessed to receive within it, in manner as represented, two lever-catches, D D, whose fulcra are exhibited at $e$ and $e$, there being fixed in the hub springs E E, to force the two lever-catches toward the journal. Sometimes, in hubs of wheels for very small carriages, especially such as are usually termed "baby-carriages," I use but one lever-catch D, as represented in Fig. 6; but in ordinary or larger wheel-vehicles I prefer to have two or more to each hub, the lesser arms of such lever-catches being extended into the space within the collar $f$ at the outer end of the hub. In Fig. 6 the lever-catch is shown as projecting into the space within a collar, $g$, at the inner end of the hub. By inserting the fingers of one hand within either of such spaces and applying them properly to the lever catch or catches, such lever catch or catches may be moved so as to uncouple the wheel and the axle.

There is to the axle an auxiliary flange, $h$, which, arranged as shown in Fig. 1, is grooved concentrically in its outer side, the groove being shown at $i$ in Figs. 1 and 4. There is in the flange an opening, $k$, leading laterally out of the groove. The two lever-catches have projections $l\,l$ extending from them into the said groove, which, with such projections, keep the lever-catches in engagement with the flange $d$.

In forcing the hub on the journal the cams $m\,m$ of the lever-catches will be carried against the flange $d$, and, as the hub may be advanced, will cause the catches to move in directions radial to the axis of the journal, and in a manner to carry the projections $l\,l$ upon the circumference of the auxiliary flange $h$. On revolving the hub the projections, by the action of the springs, will successively pass through the opening $k$ into the groove $i$, thereby causing the lever-catches to engage with a latch upon the primary flange of the journal.

The process of removing the hub from the journal will be readily understood, it being necessary first to revolve the hub, so as to enable the lever-catches to be successively disengaged from the flange. The disengagement of them having been effected, the hub may be drawn off the journal.

The box will be closed at both ends when the journal is in place within it, and thus little, if any, loss of oil or the lubricant used will result while the above may be in use.

I am aware that a wheel-hub has been provided with a catch which is secured at one end of the hub, and passing through engages at the other end the axle-collar; but this catch is not pivoted.

I claim—

1. The hub having the catch D arranged lengthwise of and pivoted within said hub, in combination with the journal provided with a collar adapted to said catch, as set forth.

2. The hub having the catch D pivoted within and provided with the projection $l$, in combination with the journal C, having the collar $h$, provided with the groove $i$ and opening $k$, as set forth.

ALBA BRIGGS CARTER.

Witnesses:
R. H. EDDY,
S. N. PIPER.